United States Patent [19]
Hunt et al.

[11] 3,993,523
[45] Nov. 23, 1976

[54] METHOD AND APPARATUS FOR ADHESIVELY JOINING A PLURALITY OF SUPERIMPOSED MATERIAL LAYERS BY A NEEDLING OPERATION

[75] Inventors: Guilbert M. Hunt; Hugh F. Groth; Carl E. Bochmann, all of Brecksville, Ohio

[73] Assignee: Booz Allen & Hamilton, Inc., Chicago, Ill.

[22] Filed: Mar. 10, 1975

[21] Appl. No.: 556,790

[52] U.S. Cl. ............................. 156/148; 156/73.5; 156/253; 156/513; 156/580
[51] Int. Cl.$^2$ ................ B29C 27/08; B32B 5/06; B32B 31/16
[58] Field of Search .......... 156/148, 253, 513, 73.5, 156/547, 380, 580, 251

[56] References Cited
UNITED STATES PATENTS

| | | | |
|---|---|---|---|
| 1,978,620 | 10/1934 | Brewster | 156/253 X |
| 2,557,668 | 6/1951 | Lincoln | 156/536 |
| 3,122,465 | 2/1964 | Keller et al. | 156/253 X |
| 3,243,332 | 3/1966 | Dritz | 156/513 |

*Primary Examiner*—Philip Dier
*Attorney, Agent, or Firm*—Fay & Sharpe

[57] ABSTRACT

Adhesive joining system for joining a plurality of superimposed material layers. An elongated needle-like member is reciprocally and rotatably driven along and about its longitudinal axis so that each reciprocation causes the needle to pass through and be withdrawn from the superimposed layers. After the needle has passed through the layers, at least the outer tip is coated with an adhesive material. The adhesive material itself may be in solid, liquid or powdered form and be either heated or unheated. After coating, withdrawal of the needle from the material layers causes the adhesive on the needle to be deposited on the material through a wiping action caused by the pressure of the material exerted against the needle. Rotation of the needle-like member gathers loose fibers from the material layers and wraps them together in the adhesive to form a reinforced joint. Upon full retraction of the needle-like member from piercing contact with the material layers, the pierced area of the layers closes to fill the cavity with adhesive and squeeze it out into the surrounding material to further strenghten the joint. After each reciprocation, the layers may be conveniently advanced in order that a joined or bonded area may be formed along a desired path.

17 Claims, 7 Drawing Figures

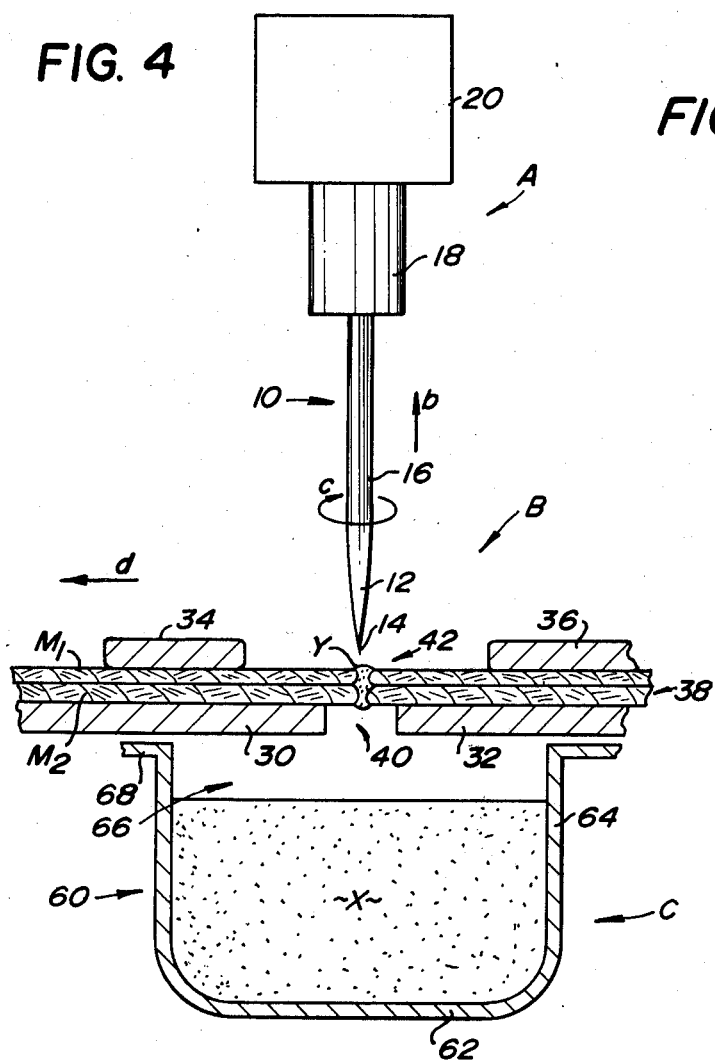
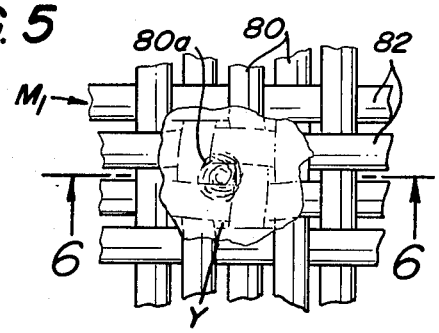
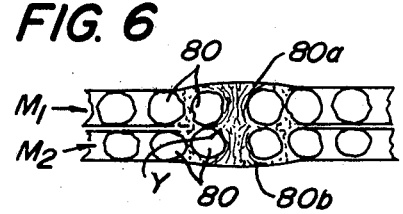
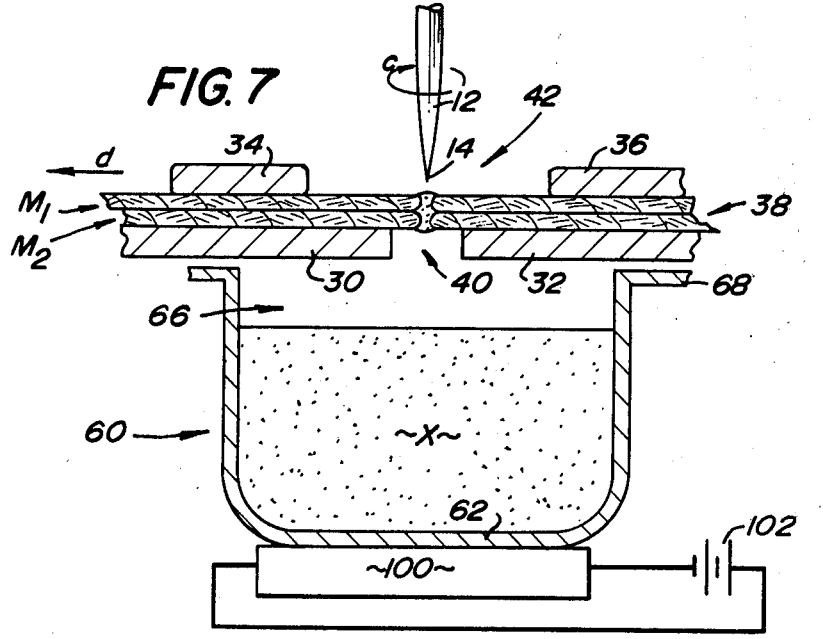

METHOD AND APPARATUS FOR ADHESIVELY JOINING A PLURALITY OF SUPERIMPOSED MATERIAL LAYERS BY A NEEDLING OPERATION

BACKGROUND OF THE INVENTION

This invention pertains to the art of joining or bonding and more particularly to adhesively joining or bonding a plurality of superimposed material layers.

The invention is particularly applicable to joining conventional fabric type materials and will be described with particular reference thereto; however, it will be appreciated by those skilled in the art that the invention has broader application and may be advantageously applied in joining other materials such as, for example, leather, synthetics and the like.

As is well known, fabrics are normally interconnected or joined together by a sewing process using conventional sewing machines which employ continuous strands of fabric or synthetic thread which is "stitched" along a desired path. In typical sewing machine operations, a continuous supply of thread is supplied to the sewing needle tip and the needle is then reciprocated through the fabric layers at the area to be joined for cooperation with thread supplied beneath the fabric by a bobbin arrangement. As the needle is reciprocated, the fabric layers are moved in timed relationship with reciprocation of the needle in order that a continuous sewed or stitched area is generated. Even though conventional sewing machines have proved extremely useful when used with fabric and other materials, having become quite sophisticated and capable of performing a number of varied sewing or stitching functions, there are certain inherent disadvantages to these conventional machines.

More particularly, the fabric or synthetic thread employed must be continuously uncoiled from a spool, bobbin or similar apparatus during the sewing or stitching operation. These spools, bobbins and like apparatus so necessary to conventional sewing machine systems are sometimes cumbersome and time consuming to use. In addition, the complexity of conventional apparatus required in order to obtain a particularly desired finished stitch may, in many instances, be quite intricate and thus, susceptible to breakdowns and other maintenance problems. Further, for both aesthetic and practical reasons, the fabric or synthetic thread employed in typical sewing or stitching operations for fabric is very thin and, therefore, not particularly strong. As a result, sewed or stitched joints formed by conventional sewing machines or systems are susceptible to damage or parting when opposed forces are applied to the sewed or stitched area. Also, because of the nature and interconnection of stitches generated by conventional sewing machines, they are susceptible to unraveling.

There have already been various attempts made toward replacing the conventional thread type sewing or stitching systems with systems employing adhesives or other bonding materials. While overcoming at least some of the disadvantages encountered with conventional sewing machines, these prior attempts at adhesive bonding or joining have not proved entirely satisfactory for widespread practical use. Some of these designs were similar to conventional sewing or stitching machines in operation, employing hollow sewing needles with adhesive material forced outwardly therefrom into the material being joined through an orifice disposed at the needle tip. In such an arrangement, the adhesive may tend to dry or become clogged within the needle or adhesive supply lines, thus requiring either needle replacement or cleaning. This, of course, generates undesired machine downtime, and is otherwise inconvenient.

Other prior adhesive bonding apparatus attempt to employ a substantially conventional sewing machine which, through modification, utilize an adhesive reservoir disposed beneath the material to be joined so that the needle is dipped into the adhesive as it reciprocated into and out of piercing engagement with the material to be joined. This type of prior apparatus, however, requires that a very sharp needle be employed and is limited to use with materials having a very minimal thickness or low resistance to piercing by the needle during the joining operation. Further, the strength of those adhesive joints thus generated is suspect inasmuch as it is difficult to insure that the adhesive material is fully dispersed through the material layers at the joining zone or area.

BRIEF DESCRIPTION OF THE PRESENT INVENTION

The present invention contemplates a new and improved adhesive joining system which overcomes the foregoing problems and others and provides a new system which is simple in design and use, economical, may be made entirely portable, provides a strong reinforced adhesive bond, may be satisfactorily employed on an increased number or thickness of layers and which is readily adaptable to any number of environments where it is desired to join a plurality of material layers.

In accordance with the present concept, an elongated needle-like member is reciprocated and rotatably driven along and about its longitudinal axis so that each reciprocation causes the needle to pass through and be withdrawn from the superimposed material layers. When the needle has passed through the layers, and before withdrawal therefrom, the needle is coated with an adhesive material. Withdrawal of the needle from piercing contact with the material layers causes the adhesive film or coating on the needle to be deposited on the material through a wiping action caused by the pressure of the material exerted against the needle. Rotation of the needle-like member gathers loose fibers from the material layers and wraps them together in the adhesive to form a reinforced joint. Upon full retraction of the needle from piercing contact with the material layers, the pierced area of the layers closes to fill the cavity with adhesive and squeeze it out into the surrounding material.

In accordance with another aspect of the present invention, apparatus for the adhesive joining system comprises an elongated needle-like member including a body portion and an outer tip wherein the member is mounted for reciprocal movement generally longitudinally of its axis and rotational movement about its axis. An adhesive reservoir is disposed subjacent the needle-like member and means for supporting the material layers are disposed intermediate the tip of the needle and the reservoir. Means are provided for reciprocating the needle between a first position with the outer tip spaced from the support means and a second position with at least the tip immersed in the adhesive in the reservoir. Means are also provided for rotating the needle about its longitudinal axis at least while the needle is moved between the first and second positions.

In accordance with another aspect of the present invention, the apparatus also includes means synchronized with reciprocation of the needle-like member for selectively feeding the superimposed material layers along the support means for joining them together along a desired path.

In accordance with still another aspect of the present invention, the apparatus includes means for selectively laterally moving the reservoir relative to the reciprocating path of travel of the needle-like member.

In accordance with a further aspect of the present invention, a method of adhesively joining a plurality of superimposed material layers together is provided and comprises the steps of:
 a. supporting the material layers intermediate an elongated needle-like member having tip and body portions and an adhesive reservoir disposed subjacent the needle-like member;
 b. reciprocating the needle-like member generally along its longitudinal axis from a first position spaced from the material layers to a second position with at least the tip portion piercing the layers and communicating with the reservoir;
 c. coating at least the tip portion of the needle-like member with an adhesive material when the member is in the second position communicating with the reservoir;
 d. depositing the adhesive coating of the neddle-like member on the material layers at the pierced area as the member is reciprocated from the second back toward the first position; and,
 e. rotating said needle-like member about said axis during at least a portion of its reciprocation.

In accordance with another aspect of the present invention, the method of joining further includes the step of squeezing the adhesive into the material layers adjacent the area pierced by the needle-like member.

In accordance with another aspect of the present invention, there is provided an adhesive bond for a plurality of material layers which comprises a bond zone defined at a selected area of the material layers with the zone having a pierced area extending therethrough. Fibers which peripherally surround the pierced area in at least some of the layers are interlocked with fibers of other of the layers and these interlocked fibers extend generally helically through the pierced area. An adhesive is disposed within and adjacent to the pierced area of the layers.

The principal object of the present invention is the provision of a new adhesive joining system which overcomes problems encountered with prior conventional sewing or stitching machines and adhesive joining or bonding apparatus.

Another object of the present invention is the provision of a new adhesive joining system which is simple in design.

Another object of the present invention is the provision of a new adhesive joining system which is simple in operation.

Still another object of the present invention is the provision of a new adhesive joining system which is economical to use.

Still a further object of the present invention is the provision of a new adhesive joining system which provides a reinforced joint or bond between a plurality of material layers.

BRIEF DESCRIPTION OF THE FIGURES

The invention may take physical form in certain parts and arrangements of parts, the preferred embodiment of which will be described in detail in the specification and illustrated in the accompanying drawings which form a part hereof and wherein:

FIG. 4 is a view similar to FIG. 1 showing the completed joint or bond betweeen the plurality of material layers and further showing a second modification for the adhesive reservoir;

FIG. 5 is an enlarged plan view of a bond in conventionally woven fabric material which results when employing the concepts of the subject invention;

FIG. 6 is a cross-sectional view taken along lines 6—6 of FIG. 5; and,

FIG. 7 shows yet another alternative arrangement for the adhesive reservoir.

DETAILED DESCRIPTION OF THE PREFERRED EMBODIMENT

Figure 1:
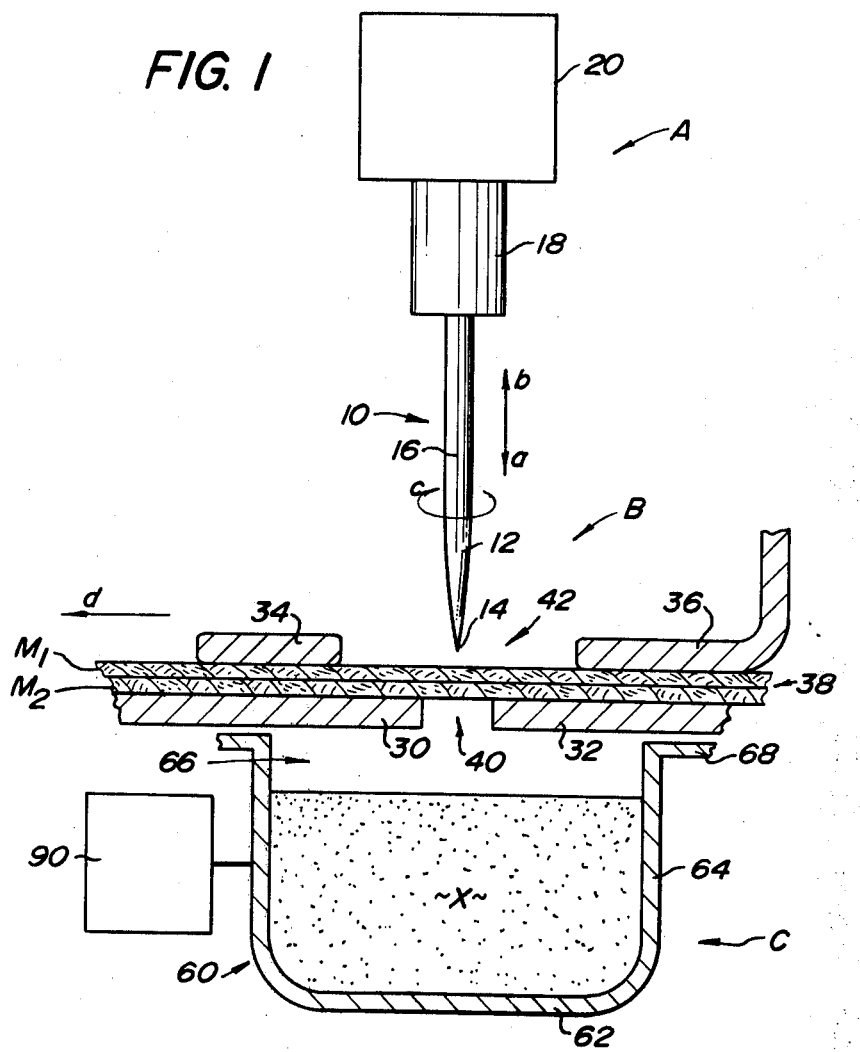
FIG. 1 is a side elevation view in partial cross-section showing the concepts employed in the subject invention with the needle-like member in the first position and with one arrangement for the adhesive reservoir.

Referring now to the drawings wherein the showings are for purposes of illustrating the preferred embodiment of the invention only and not for purposes of limiting same, the figures show a needle assembly generally designated A, a material support and guiding assembly generally designated B and an adhesive reservoir assembly generally designated C. As explained hereinafter, the material which is to be joined or bonded comprises two superimposed layers of a conventional woven fabric material; however, it should be understood and readily appreciated that this description is in no way intended to limit the scope of the subject invention since the invention is equally applicable to the bonding or joining of any number of other types of material such as, for example, leather, paper, synthetics and the like.

More specifically and with particular reference to FIG. 1, the needle assembly A is comprised of an elongated needle-like member generally designated 10 including a tapered nose portion 12 converging toward an outermost tip 14. An elongated body portion 16 is closely received in a needle retaining means 18 which, in turn, is mounted to a needle driving means 20 for reciprocating and rotating needle-like member 10 along and about its longitudinal axis. Means 18 and 20 are shown only in schematic inasmuch as the specifics of their structure are deemed known in the art and may comprise any of a number of known types of needle receiving and retaining or driving means. In addition, needle driving means 20 may comprise either a single combined or separate drive means for effecting reciprocal and rotational movement of the needle-like member. If a single drive means is employed the reciprocal and rotational speeds may be conveniently synchronized with each other such that an increase or decrease in reciprocal movement of the needle-like member causes a corresponding increase or decrease in rotational speed of the member. The choice of drive means, however, may vary depending upon the specifics of the intended use of the invention. In the figures, arrows $a$ and $b$ designate the reciprocal movement of the needle-like member and arrow $c$ designates the rotational movement of the needle. It is contemplated that the speed of rotation will be in the range of 8000 rpm so that low torque is required to drive the needle-like member because of the drilling type action. This speed of rotation may be varied in accordance with the speed of reciprocation.

Mateial guiding assembly B is comprised of lower material supports generally designated 30, 32 disposed so as to support material generally normal to the axis of the elongated needle-like member itself. Spaced above supports 30, 32 are upper material holders 34, 36. These supports could, of course, comprise a table or similar support of the type found in conventional sewing machines. Supports 30, 32 provide a base for the material to be joined in order that the material may be precisely located relative to the needle-like member. Holders 34, 36 prevent the material from lifting in direction $b$ during withdrawal of the needle from piercing contact with material as will be described hereinafter and may comprise a press foot of the type found on conventional sewing machines. Supports 30, 32 and holders 34, 36 define a material channel generally designated 38 therebetween in order that the material to be processed may be received therebetween. The members are mounted to the apparatus by convenient known means and may be adjustable in order that the width of channel 38 may be altered in order to properly accept varying material layer thicknesses. A needle passage 40 is disposed between the innermost ends of supports 30, 32 and a needle passage 42 is disposed between the innermost ends of holders 34, 36. These passages allow needle-like member 10 to be reciprocated in the directions of arrows $a$-$b$ without interference with the rest of the apparatus. In addition, at least supports 32, 34 may include convenient means to feed the material sequentially through the apparatus. Inasmuch as such feeding means are deemed conventional and known, they are not shown or described in detail herein since one skilled in the art would readily appreciate operation of such a device. For purposes of describing the invention, two superimposed layers of a conventional woven fabric material generally designated $M_1$ and $M_2$ are shown in the drawings, which layers are being fed in the direction of arrow $d$.

Disposed adjacent needle assembly A and guiding assembly B is adhesive reservoir assembly C. This reservoir is comprised of a container generally designated 60 having a bottom wall 62, a continuous side wall 64 and an open upper end 66. As shown in the figures, the container has a generally cup-like configuration and includes an outwardly extending flange 68 at the uppermost end of continuous side wall 64 for affixing the container to the apparatus by any convenient means. It will also be appreciated that use of container 60 is merely exemplary and that reservoir C may take any number of other forms without departing from the intent and scope of the present invention.

Disposed in container 60 is an adhesive material generally designated X in the figures. The specific type of adhesive may vary depending upon the materials being processed but as to the physical properties of the adhesive, it may be solid at room temperature, liquid at room temperature, heated to give the desired liquid properties for use or a powder having particular desired adhesive properties. The adhesive could also take the form commonly known as the "glue stick". The type of adhesive employed does not form a part of the present invention; however, depending upon the properties of the adhesive selected, the arrangement for container 60 may vary slightly as shown in FIGS. 1, 4 and 7, or may not be required at all. The specifics of these varied arrangements will be described in greater detail hereinafter.

Figure 2:
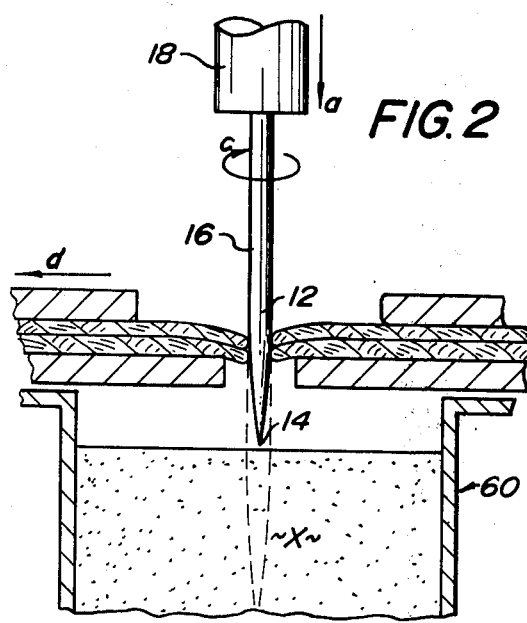
FIG. 2 is a view similar to FIG. 1 with the needle-like member moved from the first position toward the second position in piercing contact with the material layers to be joined.
Figure 3:
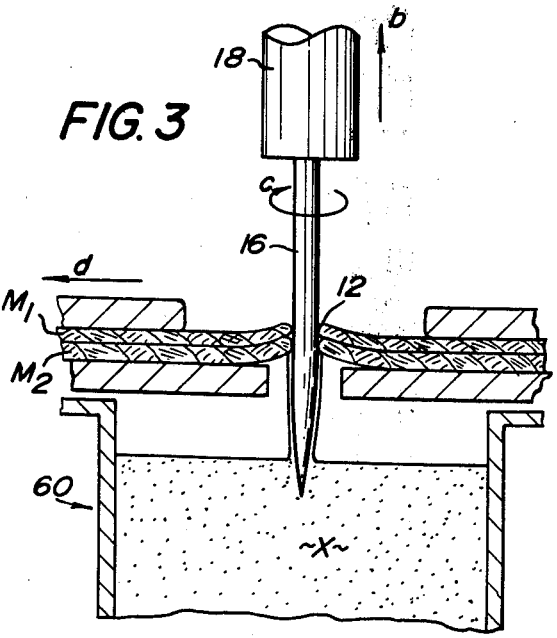
FIG. 3 is a view similar to FIGS.1 and 2 with the needle-like member shown as it is moved from the second back toward the first position.

Referring now to the method of joining two layers of superimposed material, that is, layers $M_1$ and $M_2$ to each other, particular reference is made to FIGS. 1–4. In FIG. 1, and with needle 10 rotating at a desired speed, the needle is shown in its first or uppermost position spaced from the material layers During this period, of course, the material may be fed in direction $d$ in order to achieve the joined or bonded configuration desired. In FIG. 2, the needle is shown as having been advanced downwardly in direction $a$ to a position spaced above the adhesive level in container 60 so that the outermost tip 14 and a portion of tapered nose portion 12 have pierced material layers $M_1$, $M_2$. Downward movement of the needle continues to the position shown by the broken lines in FIG. 2 until end tip 14 and a portion of nose 12 are immersed with the adhesive. The position shown by the broken lines comprises the second position of the needle. Since the needle is rotating at a high rpm, the rotation produces a drilling action so that piercing or penetration of the material requires less force than with a non-rotating needle. Thus, tip 14 need not be as sharp as would otherwise be required with, for example, a conventional sewing or stitching apparatus. As the needle-like member communicates with adhesive X, it is coated with adhesive so that, as shown in FIG. 3, as it is reciprocated in direction $b$ from the second position back toward the first position, the adhesive coating or film on the needle is withdrawn from the reservoir and carried by the needle-like member back toward and into contact with material layers $M_1$ and $M_2$. In FIG. 3, this adhesive film is shown as being first applied to the lowermost surface of layer $M_2$. However, this coating or film is also carried through the area or cavity formed by the piercing or penetrating action of the needle and resultingly coats or deposits adhesive on the fibers of both layers $M_1$ and $M_2$ as shown in FIG. 4. As nose portion 12 and tip 14 pass through material layers $M_1$, $M_2$ in direction $b$, the needle-like member is wiped clean of adhesive by the pressure of the fabric or material against the surface of the needle. As the needle leaves the fabric, the fabric "closes" behind the pierced area and this closing action thus fills the area or cavity with adhesive and then squeezes the adhesive out into the surrounding fabric.

With particular reference to FIGS. 5 and 6, the high speed of rotation of needle-like member 10 advantageously cooperates in yielding a strong reinforced joint. Accordingly, as the needle pierces fabric layers $M_1$ and $M_2$, it engages the interwoven warp threads 80 and weft threads 82 from which the fabric is made. When this occurs, small hairs, strands or fibers 80$a$ and 80$b$ from threads 80, 82 are created. Upon reciprocation of the needle from the second position in direction $b$ toward the first position, the rotation of the needle in direction $c$ gathers these loose strands or fibers 80$a$ and 80$b$ from both layers $M_1$ and $M_2$ and wraps them together to somewhat helical configuration within cavity created by the piercing action of the needle. These fibers are intertwined with adhesive material resulting in a reinforced joint. As will be seen from FIG. 6, hairs, strands or fibers 80a and 80b are drawn upwardly toward the top layers $M_1$ of fabric, or generally longitudinally along the pierced area itself.

As shown in FIGS. 4–7, the squeezing action discussed above causes an enlarged bonding zone generally designated Y to by formed peripheraly adjacent the area of material actually pierced by the needle-like member. The adhesive employed is preferably designed to dry quickly and forms an extremely strong bond since bond zone Y actually comprises an enlarged joined or bonded area reinforced with interlocking hairs, strands or fibers 80a, 80b of fabric layers $M_1$, $M_2$ at the area actually pierced by the needle-like member. Again, this interlocking occurs between fibers 80a, 80b in the plurality of layers as a result of the sliding motion of the rotating needle as it is moved from the second position in direction b back toward the first position.

As outermost tip 14 of needle 10 exits from material layers $M_1$, $M_2$ in travelling in direction b back toward the first position, the material layers themselves may be fed in direction d by the material feed means a selected distance or increment in preparation for the next reciprocation of needle 10 so that another, separate bond and bond zone Y may be formed. In this manner, the material layers may be moved along a predetermined path in order to join or bond the layers together much the same as is done with conventional sewing or stitching apparatus. The subject new apparatus, however, overcomes the problems previously incurred with the conventional equipment and, in addition, provides a reinforced joint or bond zone Y not obtainable with such prior apparatus.

In FIG. 1, the apparatus includes a container moving means generally designated 90 which may be advantageously employed if adhesive X is solid at room temperature. In such an arrangement, the rotating needle-like member penetrates the solid adhesive and the frictional heat generated by the rotating needle acts to melt the adhesive and allow needle entry and coating. However, since the adhesive is a solid at room temperature, it is necessary to provide means for sequentially moving the container slightly in a lateral direction upon each reciprocation of the needle in order to vary the line of entry of the needle into adhesive X. Each movement of the container need only be very minimal, that is, an amount to assure that the needle will be immersed in virgin adhesive at each reciprocation. Thus, the individual lateral movements will be approximately the equivalent of the largest diameter portion of the needle which is immersed in adhesive. Accordingly, container moving means 90 may comprise any convenient force means for laterally moving container 60 relative to said line of entry in order to overcome this problem. Energization of this moving means may be controlled through drive means 20 in order that it will be synchronized with reciprocation of the needle. Since means 90 may comprise any convenient means, further elaboration on the specifics is not deemed necessary.

In FIG. 4, adhesive X is in liquid form at room temperature so that it is not necessary to move or otherwise treat container 60 upon successive entries of the needle into the adhesive. Thus, the installation of container 60 in the FIG. 4 arrangement may be relatively simple, it merely being necessary to provide ease of container removal for refilling or replacement purposes.

In FIG. 7, a container heater generally designated 100 is shown as being associated with container 60. This heater may comprise any convenient means such as a resistance wire type of heater selectively energized by an electrical energy source generally designated 102. If desired, source 102 could comprise a self-contained electrical energy source such as a battery. The FIG. 7 arrangement is for particular use with adhesive X which is required to be heated for use in order to achieve the best results. The adhesive could, of course, be solid or liquid at room temperature.

Of the container 60 arrangements shown in FIGS. 1, 4 and 7, the FIG. 1 and FIG. 7 arrangements, i.e., the adhesive is solid at room temperature, are deemed to be particularly desirable. The reason for this is that during periods of inactivity or movement of the apparatus from one location to another there is no concern or danger of adhesive spillage from the reservoir.

Again, the subject invention, while being explained with reference to use in bonding conventional woven fabric type material, is equally applicable with regard to other materials such as leather, paper, synthetics, and the like. Slight design modifications may be required to accommodate specific environments in which the invention is to be employed. It has been found, for example, that a conventional sewing machine may be modified to practice the concepts of the subject invention. In addition, a conventional sewing machine needle will, under appropriate circumstances, provide satisfactory results when employed as the needle-like member 10 described hereinabove.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described our invention, we now claim:

1. Apparatus for adhesively joining together a plurality of material layers, said apparatus comprising:
   an elongated needle member including a body portion and an outer tip and having a longitudional axis, said needle member mounted for reciprocating movement generally longitudinally of said axis and rotational movement about said axis;
   an adhesive reservoir containing an adhesive material disposed subjacent of said needle member with said adhesive in said reservoir comprising the only source of adhesive to effect joining between said material layers;
   means disposed intermediate said needle member and said reservoir for supporting said material layers;
   means for reciprocating said needle member between a first position with said outer tip spaced from said reservoir and a second position piercing said material layers with said outer tip and at least a portion of said body communicating with said adhesive in said reservoir; and,
   means for rotating said needle member about said longitudinal axis at high speed at least during movement thereof from said first to said second and from said second to said first positions, the outside surface of that portion of said needle member communicating with said adhesive reservoir in said needle second position being coated with adhesive, that adhesive which comprises the adhesive coating on said needle member being deposited on said material layers at the area thereof pierced by said needle member through a combination of the rotary and reciprocal movement imparted to said needle member as said needle member is moved from said second to said first position and thereby forming a separate bond zone.

2. The apparatus as defined in claim 1 further including means for sequentially feeding said material layers along said support means for joining said layers at spaced intervals along a desired path.

3. The apparatus as defined in claim 2 further including material retaining means disposed adjacent to and spaced from said support means, said retaining and support means defining a material receiving area therebetween.

4. The apparatus as defined in claim 1 wherein said reciprocating and rotating means comprise a single drive means.

5. The apparatus as defined in claim 1 wherein said rotating means rotates said needle member at a speed of approximately 8000 rpm.

6. The apparatus as defined in claim 1 further including means associated with said containing means for heating said reservoir.

7. The apparatus as defined in claim 1 further including means for selectively laterally moving said reservoir relative to the reciprocating path of travel of said needle member.

8. A method of adhesively bonding together a plurality of material layers, said method comprising the steps of:
supporting said material layers intermediate an elongated needle member having a body portion and an outer tip and an adhesive reservoir disposed subjacent said needle member;
reciprocating said needle member generally along its longitudinal axis from a first position spaced from asid material layers to a second position with at least said outer tip piercing through said layers;
coating at least said outer end tip with an adhesive material when said needle member is in said second position;
reciprocating said needle member along its longitudinal axis from said second position back toward said first position;
rotating said needle member at high speed about said axis at least during said step of reciprocating said needle member from said first position to said second position and said step of reciprocating said needle member from said second position to said first position; and,
depositing the adhesive coating of said needle member on said material layers at the area thereof pierced by said needle member through a combination of said steps of reciprocating said needle member from said second to said first position and by said step of rotating said needle member and thereby forming a separate bond zone.

9. The method as defined in claim 8 wherein said material layers comprise fibrous materials and wherein said method further includes the step of interlocking fibers from separate ones of said layers with fibers of other layers along a pierced area at least during said steps of reciprocating and rotating said needle member from said second toward said first position.

10. The method as defined in claim 8 further including the step of squeezing said adhesive into said material layers adjacent the area pierced by said needle member following said step of depositing.

11. The method as defined in claim 8 wherein said step of rotating comprises rotating said needle member at a speed of approximately 8000 rpm.

12. The method as defined in claim 8 including the step of sequentially moving said material layers a spaced interval when said needle member is withdrawn from piercing contact with said material layers as said needle member is reciprocated from said second position back toward said first position and continuously repeating said steps of reciprocating, coating, reciprocating, depositing, rotating and moving along a desired path on said material layers.

13. The method as defined in claim 12 further including the step of substantially confining the uppermost surface of said material layers against movement coextensive with said needle member as said member is reciprocated from said second toward said first position.

14. In apparatus for adhesively joining together a plurality of material layers by means of an elongated needle member including a body portion, an outer tip and a longitudinal axis with said needle member being reciprocated generally longitudinally of said axis between a first position with said outer tip spaced from said material layers and a second position piercing said material layers and wherein an adhesive material is communicated by said needle member to said material layers at least at the area thereof pierced by said needle member during at least a portion of the reciprocal movement thereof between said first and second position, the improvement comprising:
an adhesive reservoir containing an adhesive material disposed subjacent said needle member in a manner such that said material layers are disposed intermediate of said outer tip and said adhesive reservoir when said needle member is in said first position and said needle member piercing said material layers with said outer tip and a portion of said body communicating with and being coated by adhesive material in said adhesive reservoir when said needle member is in said second position, said adhesive material comprising the only source of adhesive to effect joining between said material layers; and,
means for rotating said needle member about said axis at high speed at least during movement thereof from said first to said second and from said second to said first positions, with the adhesive material which comprises the adhesive coating on said needle member being deposited on said material layers at the area pierced by said needle member through a combination of the rotary and reciprocal movement imparted to said needle member as said needle member is moved from said second to said first position so as to form a separate bond zone.

15. The improvement as defined in claim 14 wherein said rotating means rotates said needle member at a speed of approximately 8000 rpm.

16. The improvement as defined in claim 14 further including means for heating said adhesive reservoir.

17. The improvement as defined in claim 14 further including means for selectively laterally moving said adhesive reservoir relative to the reciprocating path of travel of said needle member.

* * * * *